Patented Feb. 2, 1954

2,668,120

UNITED STATES PATENT OFFICE 2,668,120

WATER-SOLUBLE FILMS

Clyde W. Leaf and Lawrence M. Liggett, Wyandotte, Mich., assignors to Wyandotte Chemicals Corporation, Wyandotte, Mich., a corporation of Michigan No Drawing. Application August 21, 1952, Serial No. 305,688

4 Claims. (Cl. 106—189)

The present invention relates to water-soluble films which comprise a water-soluble salt of carboxymethylcellulose and which contain as plasticizer a mixture of glycerine and sorbitol.

An outstanding development of the chemical art has been the rapid expansion and growth in the use of plastic films. Polyvinyl chloride and polyethylene are the principal resins used in preparing such films and are fabricated into a wide variety of consumer goods such as shoes, shower curtains, draperies, etc. Heretofore, essentially all plastic films have been of the water-insoluble variety, which characteristic is desirable for the end uses intended. There are a wide variety of uses, however, where it is desirable to add a fixed quantity of a powder or liquid to an aqueous solution and in these applications, it would be highly desirable to have a water-soluble film which could be used as a packaging material. Examples of solid materials that could be conveniently packaged in such water-soluble film include soap, detergents, soup concentrates, sugar, dehydrated food products, pharmaceutical preparations, etc. Heretofore, the only water-soluble film-forming materials available to the art were natural products such as gelatin, glues, etc., which lack strength and other desirable physical properties that are essential if thin plastic films are to be used as a packaging material.

It has been proposed that water-soluble films be prepared from certain cellulose ethers such as methylcellulose. In general, the films prepared from such cellulose ethers have poor physical properties and are much too brittle to be of practical value. It has been further suggested that the physical characteristics of the cellulose ether films can be improved by the use of plasticizers such as certain of the polyhydric alcohols, e. g. glycerine, sorbitol, etc. Although the use of plasticizers in such films has some value, the properties of the film leave much to be desired. For example, glycerine is an efficient plasticizer, but makes the resulting film much too tacky to be acceptable as a packaging material, whereas other plasticizers such as sorbitol are inefficient in their plasticizing action and crystallize in the film imparting a cloudy or hazy appearance thereto.

It is an object of this invention to provide a water-soluble plastic film having desirable physical characteristics.

Another object of this invention is to provide a water-soluble plastic film of good physical properties which is essentially odorless, tasteless, and nontoxic.

Other objects and advantages of this invention will become apparent from the following detailed description thereof.

We have now discovered that dry, tack-free, water-soluble plastic films which have good physical properties may be obtained from a composition comprising a water-soluble salt of carboxymethylcellulose and a plasticizer consisting of glycerine and sorbitol. Both the relative proportion of glycerine to sorbitol in the film as well as the total concentration of plasticizer incorporated in the water-soluble salt of carboxymethylcellulose are critical in the preparation of films having good physical properties. The plasticizer included in the water-soluble film must consist of 35-65% glycerine and the balance sorbitol, while the total amount of plasticizer incorporated into the water-soluble salt of carboxymethylcellulose ranges from 30 to about 100 parts plasticizer per 100 parts of the water-soluble salt of carboxymethylcellulose.

Essentially any water-soluble salt of carboxymethylcellulose, such as the alkali metal salts, the ammonium salt, the organic amine salts, etc., can be used as the resin base for the water-soluble plastic films, but for practical reasons of economy the sodium salt is the preferred embodiment of the invention. To be water-soluble, the carboxymethylcellulose must contain an average of at least 0.3 glycollic acid groups per glucose unit of cellulose. As the degree of substitution, i. e. the number of glycollic acid residues per glucose unit of cellulose, is increased above the minimum lower limit of approximately 0.3, the carboxymethylcellulose becomes increasingly more water-soluble and by choosing a sodium carboxymethylcellulose having a specified degree of substitution, it is possible to regulate to a degree the water-solubility rate of the subsequently formed water-soluble plastic film.

Sodium carboxymethylcellulose is normally prepared by reacting alkali cellulose with sodium chloroacetate and the technical grade product frequently contains up to 35% reaction impurities, principally, NaCl. While a film can be prepared from the technical grade product, the inorganic contaminants crystallize in the film, thereby imparting a hazy appearance thereto and lowering the strength of the film. Accordingly it is preferable to purify the sodium carboxymethylcellulose so that it contains not more than approximately 10% inorganic content. When the sodium carboxymethylcellulose contains not more than 0.5 glycollic acid groups per glucose unit of cellulose, it may be purified by adding the powdered salt to a 5-35% solution of sulphuric acid to recover the free carboxymethylcellulose. The free carboxymethylcellulose is then converted to the sodium salt by treatment with dilute sodium hydroxide. The ammonium and amine salts are normally prepared by reacting the organic base with free carboxymethylcellulose and need no subsequent purification.

The following examples are set forth to more clearly illustrate the principle and practice of this invention to those skilled in the art.

*Example 1*

A water-soluble film was prepared from sodium carboxymethylcellulose containing approximately 0.5 glycollic acid residues per glucose unit of cellulose and having a viscosity of 339 c. p. s. in a 2% aqueous solution. An aqueous casting solution was prepared by incorporating 3 grams of the above described sodium carboxymethylcellulose, 1.5 grams of glycerine and 1.5 grams of a 70% aqueous solution of sorbitol in 100 grams of water. After thoroughly mixing the ingredients to obtain a homogeneous solution, the syrup-like solution was evenly spread into a thin film on a polished stainless steel plate and allowed to air-dry at approximately 25° C. After the water had evaporated from the casting solution, a thin, clear film was obtained which had good physical properties. The film had a thickness of 3–3.5 mils and had a bursting strength of 41 Mullen points as measured by A. S. T. M. Test Procedure D774.

*Example 2*

In this run a sodium carboxymethylcellulose containing approximately 0.5 glycollic acid residue per glucose unit of cellulose and having the following analysis was employed in preparing the film:

Ingredient:
- Water _____ per cent__ 6.33
- Transmission [1] _____ do____ 75.0
- pH [1] _____ 7.52
- Active agent [1] _____ per cent__ 90.7
- Viscosity [1] _____ c. p. s__ 43.6
- Sodium chloride [1] _____ per cent__ 3.07

[1] Dry basis.

A casting solution was prepared by incorporating 4.1 parts of the above described sodium carboxymethylcellulose, 2.05 parts of glycerine and 2.05 parts of a 70% aqueous solution of sorbitol in 91.8 parts of water. This casting solution was cast into a thin film using a conventional three-roll reverse roll coater type film casting apparatus such as that manufactured by John Waldron Corporation of New Brunswick, New Jersey. The resulting film weighed 5.43 grams per 100 sq. inches, contained 8.2% moisture and had a film thickness of 2.5–3 mils. The bursting strength of the film, as determined by A. S. T. M. Test Procedure D774, was approximately 30 Mullen points.

*Example 3*

A water-soluble film was prepared from diethylammonium carboxymethylcellulose containing approximately 0.5 glycollic acid residues per glucose unit of cellulose. A casting solution was prepared by dissolving 6 grams of the diethylammonium carboxymethylcellulose, 3 grams of a 70% aqueous solution of sorbitol and 2 grams of glycerine in 200 ml. of water, and a film was cast therefrom essentially as described in Example 1. The film was 3 mils thick and had a bursting strength of 30 Mullen points, as determined by A. S. T. M. Test Procedure D774.

In an analogous manner, comparable films of good quality were cast employing the ammonium, triethylamine, diisopropylamine, diisobutylamine, ethylenediamine, 1,2 propylenediamine, hexamethylenediamine, ethanolamine, benzyldimethylamine and benzyltrimethylammonium hydroxide salts of carboxymethylcellulose.

What is claimed is:

1. A water-soluble plastic film consisting of 100 parts of a water-soluble salt of carboxymethylcellulose containing at least 0.3 glycollic acid residues per glucose unit of cellulose and 30–100 parts plasticizer, said plasticizer consisting of 35–65% glycerine and the balance sorbitol.

2. The composition of claim 1 wherein the water-soluble salt of carboxymethylcellulose is the sodium salt.

3. The composition of claim 1 wherein the water-soluble salt of carboxymethylcellulose is the ammonium salt.

4. A water-soluble film consisting of 100 parts sodium carboxymethylcellulose, 50 parts glycerine and 35 parts sorbitol.

CLYDE W. LEAF.
LAWRENCE M. LIGGETT.

References Cited in the file of this patent

UNITED STATES PATENTS

| Number | Name | Date |
| --- | --- | --- |
| 2,226,823 | Kropscott | Dec. 31, 1940 |
| 2,235,798 | Collings et al. | Mar. 18, 1941 |
| 2,340,072 | Medl | Jan. 25, 1944 |
| 2,350,161 | Gloor | May 30, 1944 |